(12) United States Patent
Kremper et al.

(10) Patent No.: US 11,982,331 B2
(45) Date of Patent: May 14, 2024

(54) TORSIONAL VIBRATION DAMPER

(71) Applicant: Schaeffler Technologies AG & Co. KG, Herzogenaurach (DE)

(72) Inventors: Philippe Kremper, Strasbourg (FR); Alain Rusch, Gambsheim (FR); Martin Häßler, Graben-Neudorf (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 824 days.

(21) Appl. No.: 17/041,194

(22) PCT Filed: Mar. 18, 2019

(86) PCT No.: PCT/DE2019/100239
§ 371 (c)(1),
(2) Date: Sep. 24, 2020

(87) PCT Pub. No.: WO2019/196978
PCT Pub. Date: Oct. 17, 2019

(65) Prior Publication Data
US 2021/0033151 A1 Feb. 4, 2021

(30) Foreign Application Priority Data
Apr. 10, 2018 (DE) .......................... 102018108414.5

(51) Int. Cl.
*F16F 15/12* (2006.01)
*F16F 15/123* (2006.01)
(Continued)

(52) U.S. Cl.
CPC .... *F16F 15/1204* (2013.01); *F16F 15/12353* (2013.01); *F16F 15/1292* (2013.01);
(Continued)

(58) Field of Classification Search
CPC .............. F16F 15/1202; F16F 15/1204; F16F 15/1205; F16F 15/12353; F16F 15/129;
(Continued)

(56) References Cited

U.S. PATENT DOCUMENTS 5,884,735 A * 3/1999 Eckel .................... F16F 15/145
267/136
6,962,533 B2 * 11/2005 Zottmann ......... F16F 15/13492
464/68.92
(Continued)

FOREIGN PATENT DOCUMENTS

DE 102010049553 A1 * 5/2011 ............ F16F 15/145
DE 102011014939 A1 10/2011
(Continued)

*Primary Examiner* — Josh Skroupa

(57) ABSTRACT

A torsional vibration damper includes an input part for introducing a torque, a first cam mechanism, an intermediate element, a compression spring engaged with the intermediate element, a second cam mechanism for discharging a vibration-damped torque, and a frictional element for friction damping. The intermediate element is coupled to the input part via the first cam mechanism such that a relative rotation between the input part and the intermediate element is converted into a linear movement of the intermediate element radially inward or radially outward. The output part is coupled to the intermediate element via the second cam mechanism such that a linear movement of the intermediate element is converted into a relative rotation between the output part and the intermediate element. The frictional element is pressed against the intermediate element or the output part. The frictional element may be movement-coupled to the intermediate element or the output part.

11 Claims, 3 Drawing Sheets

(51) Int. Cl.
*F16F 15/129* (2006.01)
*F16D 3/12* (2006.01)
*F16D 3/14* (2006.01)
*F16D 69/02* (2006.01)
*F16D 121/14* (2012.01)

(52) U.S. Cl.
CPC .............. *F16D 3/12* (2013.01); *F16D 3/14* (2013.01); *F16D 69/023* (2013.01); *F16D 69/026* (2013.01); *F16D 2121/14* (2013.01); *F16D 2200/0052* (2013.01); *F16D 2200/0056* (2013.01); *F16F 2222/04* (2013.01); *F16F 2224/0241* (2013.01); *F16F 2224/025* (2013.01); *F16F 2232/02* (2013.01); *F16F 2234/06* (2013.01)

(58) Field of Classification Search
CPC .. F16F 15/1292; F16F 15/139; F16F 15/1392; F16F 15/13128; F16F 15/13157; F16F 15/13492; F16F 15/145; F16F 15/1471; F16F 2230/0064
USPC .............................................. 464/68.4, 68.41
See application file for complete search history.

(56) References Cited

U.S. PATENT DOCUMENTS

| | | | | |
|---|---|---|---|---|
| 8,393,247 | B2 * | 3/2013 | Glassner | F16F 15/13157 |
| | | | | 464/68.2 |
| 8,435,123 | B2 * | 5/2013 | Bai | F16F 15/145 |
| | | | | 464/68.2 |
| 10,100,898 | B2 * | 10/2018 | Kram | F16F 15/145 |
| 10,247,274 | B2 * | 4/2019 | Dinger | F16F 15/145 |
| 11,015,677 | B2 * | 5/2021 | Häßler | F16F 15/1204 |
| 11,454,287 | B2 * | 9/2022 | Ahnert | F16F 15/1204 |

FOREIGN PATENT DOCUMENTS

| | | | | |
|---|---|---|---|---|
| DE | 102014206494 | A1 * | 10/2014 | F16F 15/145 |
| DE | 102014206494 | A1 | 10/2014 | |
| DE | 102014210685 | A1 | 12/2014 | |
| DE | 102014211711 | A1 * | 12/2015 | F16F 15/145 |
| DE | 102014211711 | A1 | 12/2015 | |
| DE | 102015204027 | A1 * | 9/2016 | F16F 15/145 |
| DE | 102015211899 | A1 | 12/2016 | |
| DE | 102015213035 | A1 * | 1/2017 | F16F 15/145 |
| DE | 102015224585 | A1 * | 6/2017 | F16F 15/145 |
| DE | 102016213548 | A1 * | 1/2018 | F16F 15/145 |
| JP | 2016118273 | A * | 6/2016 | F16F 15/145 |
| WO | WO-2014202072 | A1 * | 12/2014 | F16F 15/1205 |
| WO | WO-2017045677 | A1 * | 3/2017 | F16F 15/145 |

\* cited by examiner

TORSIONAL VIBRATION DAMPER

CROSS-REFERENCE TO RELATED APPLICATIONS

This application is the United States National Phase of PCT Appln. No. PCT/DE2019/100239 filed Mar. 18, 2019, which claims priority to German Application No. DE102018108414.5 filed Apr. 10, 2018, the entire disclosures of which are incorporated by reference herein.

TECHNICAL FIELD

The disclosure relates to a torsional vibration damper, with the help of which torsional vibrations in a powertrain of a motor vehicle can be damped.

BACKGROUND

DE 10 2015 211 899 A1 discloses a torsional vibration damper designed as a pendulum rocker damper, in which, when an input part is rotated via a first cam mechanism, opposite intermediate elements designed as a pendulum rocker are linearly displaced relative to one another to compress and/or relax compression springs acting on the intermediate elements. The spring force of the compression springs is supported on an output part via a second cam mechanism acting on the intermediate elements, to discharge a vibration-damped torque.

SUMMARY

According to the disclosure, a torsional vibration damper, in particular a pendulum rocker damper, is provided having an input part for introducing a torque and two intermediate elements, designed as a pendulum rocker, for example. The intermediate elements are coupled to the input part, e.g., via a first cam mechanism, such that a relative rotation between the input part and the intermediate elements can be converted into a linear movement of the intermediate elements towards and/or away from one another. The torsional vibration damper also includes at least one energy storage element which engages the intermediate elements, designed as a compression spring, for example, and an output part for discharging a vibration-damped torque. The output part, e.g., via a second cam mechanism, is coupled to the intermediate elements such that a relative linear movement between the intermediate elements can be converted into a rotational movement of the output part relative to the intermediate elements. The torsional vibration damper also includes at least one frictional element for damping under the effect of friction. The frictional element is pressed against the intermediate element or the output part and/or is movement-coupled to the intermediate element or the output part.

The energy storage elements may be designed as compression springs that, together with the intermediate elements and the coupled input part and output part, form an oscillatory mass-spring system which is usually operated in a supercritical mode. For example, when starting a motor vehicle having a powertrain with the torsional vibration damper designed as a pendulum rocker damper, it can occur that the torsional vibration damper must pass through the resonance speed thereof. A deliberate damping under the effect of friction can be provided by the frictional element, which can dampen a resonance-induced build-up of torsional vibrations in the torsional vibration damper and enable good torsional vibration damping in a powertrain of a motor vehicle.

The frictional element can be pressed against the intermediate element, for example, and the frictional element can, for example, be movement-coupled to the output part, so that damping under the effect of friction can be achieved by a relative movement between the intermediate element and the frictional element. It is also possible for the frictional element to be movement-coupled to the intermediate element and to press against another component, for example the output part, so that again a relative movement between the intermediate element and the other component produces damping under the effect of friction. This exploits the fact that the intermediate element only executes a relative movement when there is a torsional vibration to be damped, so that in the absence of a torsional vibration there is also no friction of the frictional element that affects the efficiency.

In addition, the relative movement between the intermediate elements and the output part can be adapted by the type of coupling of the output part to the intermediate elements. For example, a translation of the second cam mechanism can be adapted by a unified course of a coupler curve, e.g., by a suitable choice of ramp slopes along the coupler curve. This makes it possible to set the damping under the effect of friction of the frictional element as a function of the gear ratio progression of the cam mechanism. For example, the translation of the cam mechanism cannot be constant and instead depends on the relative angle of rotation of the output part to the intermediate elements, so that it is possible to provide a certain designed hysteresis via the design of the movement coupling of the output part with the intermediate elements, which can be set individually along a torsional characteristic of the torsional vibration damper. The frictional element can use the relative movement between the intermediate elements and the output part to provide a damping under the effect of friction that is individually adjusted depending on the movement coupling of the output part to the intermediate elements, such that a high degree of torsional vibration damping is facilitated in a powertrain of a motor vehicle.

The movement coupling of the input part with the intermediate elements and/or the movement coupling of the output part with the intermediate elements can take place, for example, via cam mechanisms, which can be designed as shown in DE10 2015 211 899 A1, the content of which is hereby incorporated by reference as part of the disclosure.

In an example embodiment, the output part covers the intermediate elements when viewed in the axial direction, and the frictional element is arranged in the axial direction between the intermediate element and the output part. The extent of the intermediate element in the radial direction can be adjusted due to the space available there to create a correspondingly large friction surface for the frictional element. In addition, the frictional element can be pressed in the axial direction between the respective intermediate element and the output part to be able to provide the desired friction.

In an example embodiment, the output part has a first output disk and a second output disk coupled to the first output disk in a rotationally fixed manner. The intermediate elements are arranged in the axial direction between the first output disk and the second output disk, and one of the frictional elements is arranged between the intermediate element and the first output disk and between the intermediate element and the second output disk, respectively. This makes it possible to provide a frictional element on both axial sides of the respective intermediate element, which provides a damping under the effect of friction when the respective intermediate element moves relative to the two output disks.

The frictional element may be suspended on the intermediate element or on the output part. At least one, e.g., inner, first suspension lug suspended in a corresponding recess and at least one, e.g., outer, second suspension lug suspended in a corresponding recess are provided, and the frictional element is secured in position in the radial and/or tangential direction by the first suspension lug and the second suspension lug being secured. The frictional element can thus be assembled and exchangeably connected to the intermediate element or the output part.

The suspension lugs can define the frictional element in the radial and/or tangential direction. For example, the frictional element can be clamped essentially free of play between two suspension lugs. Rattling of the frictional element can thus be avoided. For this purpose, the recess can be designed as a closed opening, recess or edge of the intermediate element or of the output part. For example, two suspension lugs can grip part of the intermediate element or the output part, and the gripped part may be clamped between the suspension lugs. At least one suspension lug may have a substantially U-shaped hook so that the frictional element can be suspended on the suspension lug designed as a hook and pivoted about this hook until the other suspension lug engages and, for example, locks in to place.

In an example embodiment, the output part, e.g., the first output disk and the second output disk, can be displaced in the axial direction relative to the intermediate elements. The frictional element is pressed between the intermediate element and the output part by a spring element acting on a rear side of the output part facing away from the frictional element. The spring element can easily press the entire package, including the output part, the intermediate piece and the frictional element, against an axial stop to exert force required for the desired friction on the frictional element using the spring force of the package. For example, a spring element designed as a plate spring is sufficient to provide damping under the effect of friction on both axial sides of the intermediate element with the aid of a frictional element.

A spring element engaging the frictional element for pressing the frictional element against the intermediate element or the output part may be arranged between the output part and the intermediate element. The output part, e.g., the first output disk and the second output disk, can be designed to be essentially immobile in the axial direction. The spring element can be supported on one component, e.g., movement-coupled, between the output part and the intermediate element, and press the frictional element against the other component to provide the damping under the effect of friction. The spring element can be received between the output part and the intermediate element protected from external influences.

The spring element may be pretensioned, and designed, for example, as a plate spring or an elastomer body. The pretensioning prevents the frictional element from rattling. For this purpose, the spring element need not be designed as a helical spring, but can have a space-saving design in the axial direction, for example.

In an example embodiment, the frictional element may be designed as a separate component from the intermediate element and the output part. In principle, it is possible to design the frictional element as a coating and/or surface structuring of the intermediate element and/or of the output part. For different areas of application of the torsional vibration damper, the design of the frictional element as a separate component makes it easier to select a suitable frictional element from a plurality of frictional elements with different friction properties, and to maintain the remaining torsional vibration damper. In addition, in the event of wear, only the frictional element need be replaced with little installation effort and low maintenance costs.

The frictional element may have carbon fibers comprising polyamide, Teflon and/or graphite on at least one friction surface thereof. A comparatively wear-resistant friction surface for the frictional element can thereby be achieved. In addition, a comparatively low coefficient of friction due to these materials is already sufficient to achieve sufficient friction to avoid a build-up of torsional vibrations caused by resonance.

The disclosure further relates to a coupling disk for a friction clutch, which can be provided in the powertrain of a motor vehicle, having a torsional vibration damper which can be designed and developed as described above, for damping torsional vibrations. For example, friction linings can be fastened to the input part of the torsional vibration damper and can be pressed between a pressure plate and a counter plate of the friction clutch in a frictionally engaged manner to transmit a torque to the coupling disk. The frictional element can use the relative movement between the intermediate elements and the output part to provide a damping of the torsional vibration damper under the effect of friction that is individually adjusted depending on the movement coupling of the output part to the intermediate elements, such that a high degree of torsional vibration damping is facilitated in a powertrain of a motor vehicle.

The disclosure further relates to a friction clutch for producing and/or interrupting a torque transmission in a powertrain of a motor vehicle with a counter plate for introducing a torque originating from a drive shaft of a motor vehicle engine, for example, a coupling disk, which can be designed and developed as described above, for discharging the torque to a transmission input shaft of a motor vehicle transmission, for example, and a pressure plate which can be displaced axially relative to the counter plate for pressing the coupling disk between the counter plate and the pressure plate in a frictionally engaged manner. The frictional element can use the relative movement between the intermediate elements and the output part to provide a damping of the torsional vibration damper under the effect of friction that is individually adjusted depending on the movement coupling of the output part to the intermediate elements, such that a high degree of torsional vibration damping is facilitated in a powertrain of a motor vehicle.

The disclosure further relates to a powertrain of a motor vehicle, in particular an electrically drivable motor vehicle, with a flywheel drivable by an internal combustion engine and/or an electrical machine, a torsional vibration damper connected directly or indirectly to the flywheel, which can be designed and developed as described above, for damping torsional vibrations, and a transmission input shaft of a motor vehicle transmission connected directly or indirectly to the torsional vibration damper. The frictional element can use the relative movement between the intermediate elements and the output part to provide a damping of the torsional vibration damper under the effect of friction that is individually adjusted depending on the movement coupling of the output part to the intermediate elements, such that a high degree of torsional vibration damping is facilitated in a powertrain of a motor vehicle.

BRIEF DESCRIPTION OF THE DRAWINGS

In the following, the disclosure is explained by way of example with reference to the attached drawings using exemplary embodiments, where the features shown below can represent an aspect of the disclosure both individually and in combination. In the figures.

DETAILED DESCRIPTION

Figure 1:
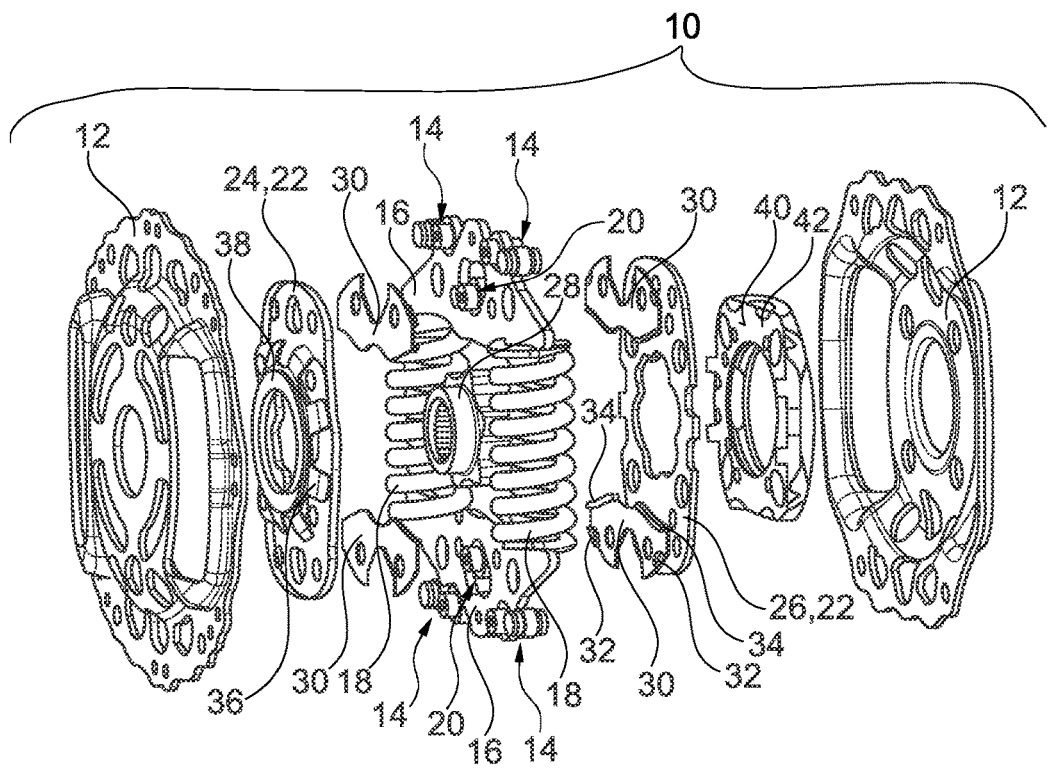
FIG. 1 shows a schematic perspective exploded view of a first embodiment of a torsional vibration damper.

The torsional vibration damper 10 shown in FIG. 1, designed as a pendulum rocker damper, has an input part 12 which comprises two outer input disks and, for example, can be part of a coupling disk of a friction clutch in a powertrain of a motor vehicle. For example, on the radially outer edge of the input part 12, friction linings of the coupling disk can be provided, via which a torque generated by a motor vehicle engine can be introduced. The input part 12 is coupled via a respective first cam mechanism 14 to two intermediate elements 16 designed as pendulum rockers. To form the first cam mechanism 14, the input part 12 and the intermediate element 16 can have suitably designed straight and/or curved tracks or ramps, on which a roller, rolling element or other coupling element can be guided.

Between the two intermediate elements 16, two energy storage elements 18 are provided, which run parallel to one another and are designed as compression springs. In the event of a relative rotation between the input part 12 and the intermediate elements 16 caused by a torsional vibration, the first cam mechanism 14 can convert the relative rotation of the input part 12 into a linear relative displacement of the intermediate elements 16 towards or away from one another, which results in compression or relaxation of the energy storage elements 18.

The intermediate elements 16 are coupled to an output part 22 by means of second cam mechanisms 20 which are designed essentially analogously to the first cam mechanisms 14. In the event of a linear movement of the intermediate elements 16, the second cam mechanism 20 can convert the linear movement of the intermediate elements 16 into a relative rotation between the output part 22 and the intermediate elements 16. The output part 22 has a first output disk 24 and a second output disk 26 between which the intermediate elements 16 are arranged. The output part 22 can be connected in a rotationally fixed manner to a hub 28 which, for example, has an internal toothing to be able to engage a spline toothing with a transmission input shaft of a motor vehicle transmission.

As a result, the relative movement between the intermediate elements 16 and the output part 22 can be used to provide deliberate damping under the effect of friction. Here, frictional elements 30 are provided between the intermediate elements 16 and the first output disk 24 on the one hand and between the intermediate elements 16 and the second output disk 26 on the other hand. The frictional elements 30 have radially inner first suspension lugs 32 and radially outer second suspension lugs 34 to suspend the respective frictional element 30 on the associated intermediate element 16 and in particular to clamp the assigned intermediate element 16 between the first suspension lugs 32 and the second suspension lugs 34. This also results in a fixed connection between the frictional element 30 and the intermediate element 16.

Figure 2:
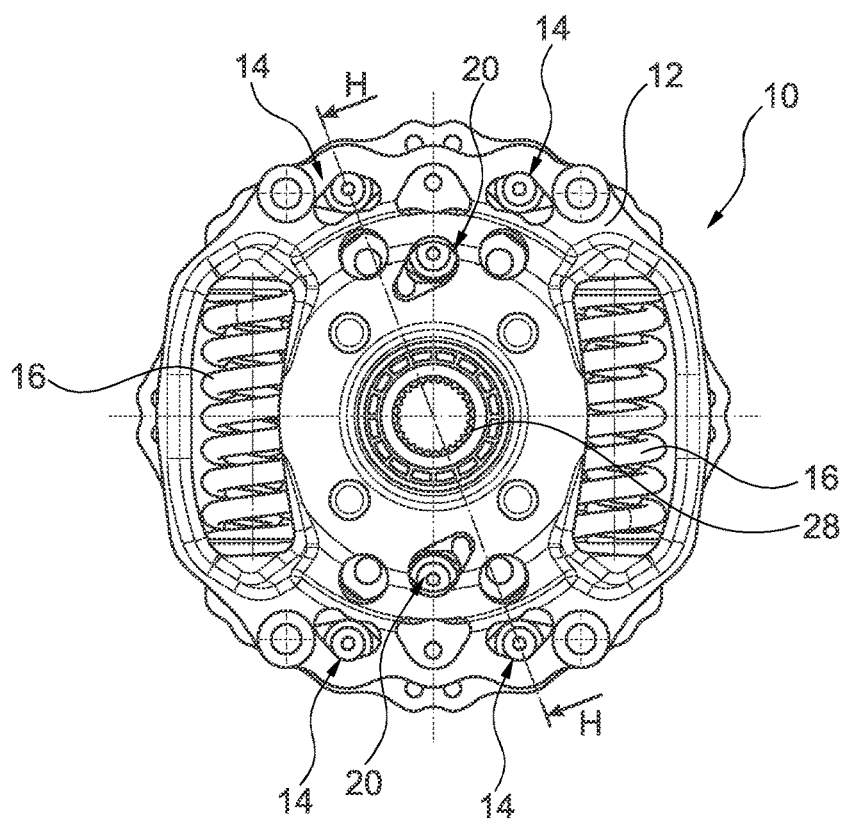
FIG. 2 shows a schematic top view of the torsional vibration damper from FIG. 1.
Figure 3:
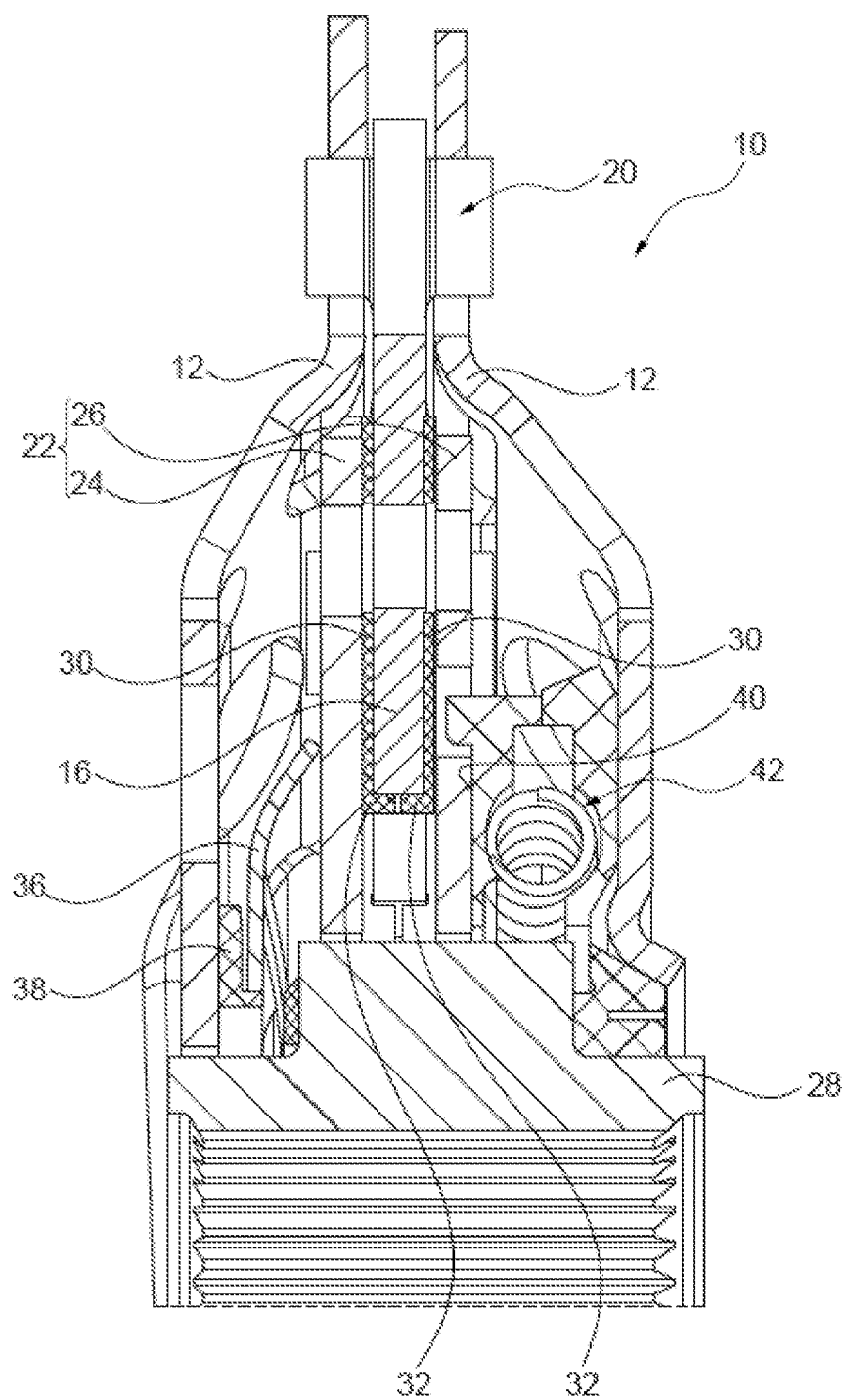
FIG. 3 shows a schematic sectional view of the torsional vibration damper from FIG. 2 along a sectional plane H-H.

In the exemplary embodiment shown in FIGS. 1 to 3, a spring element 36 designed as a plate spring is provided, which is optionally supported on the input part via a slide ring 38 and is pretensioned against the output part 22, for example the first output disk 24. The output disks 24, 26, which are movable in the axial direction, can be pressed together with the intermediate elements 16 against an axial stop 40, as a result of which the frictional elements 30 are pressed between the intermediate elements 16 and the output disks 24, 26. In the illustrated exemplary embodiment, the axial stop 40 is formed by a further damping stage 42 which is fixed against movement in the axial direction.

Figure 4:
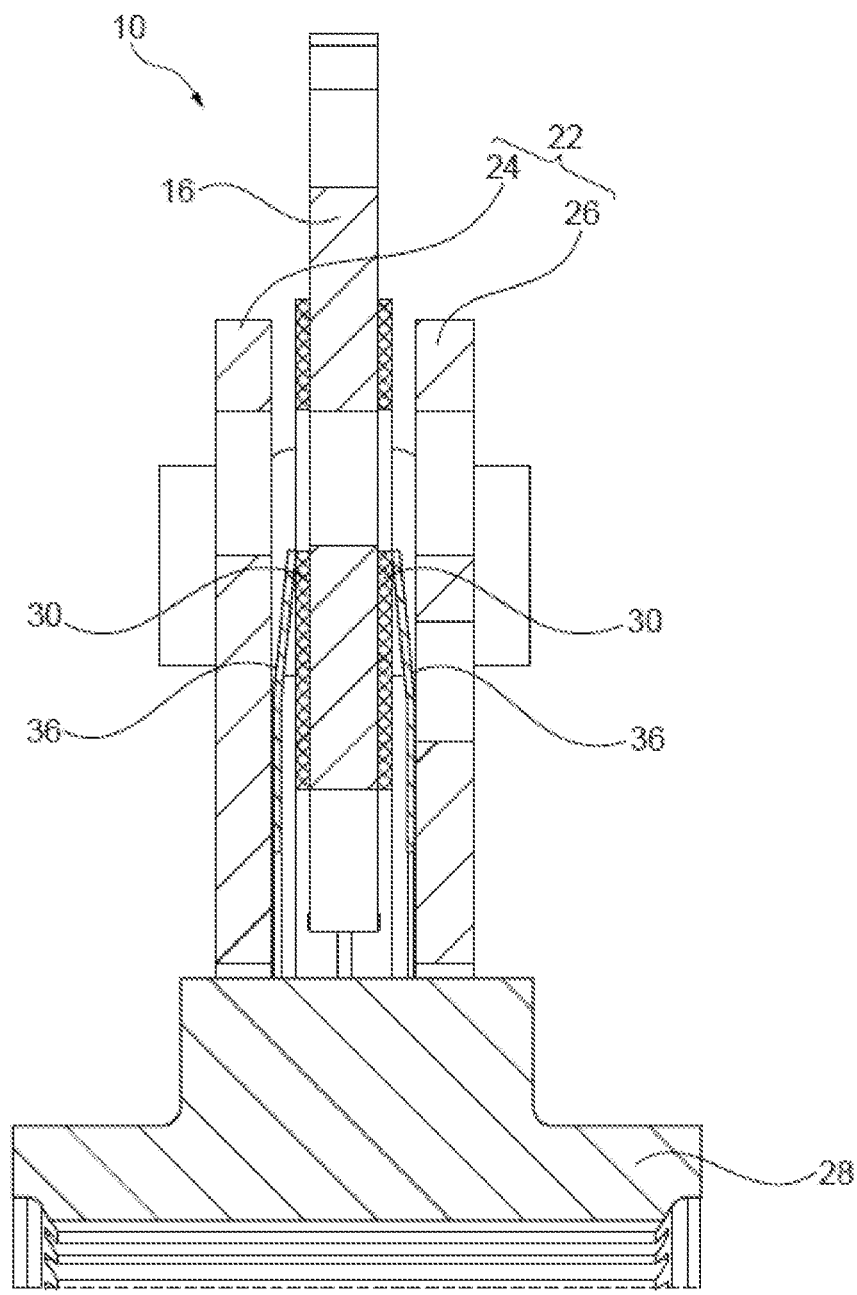
FIG. 4 shows a schematic simplified sectional view of a second embodiment of a torsional vibration damper.

In the exemplary embodiment of the torsional vibration damper 10 shown in FIG. 4, in comparison to the exemplary embodiment of the torsional vibration damper 10 shown in FIGS. 1 to 3, the output disks 24, 26 of the output part 22 are held at a constant spacing apart from one another and from the intermediate elements 16, for example, with the help of spacing elements. In this case, a spring element 36, for example, in the form of a plate spring, is provided on both axial sides of the intermediate elements 16, which are supported on the associated output disk 24, 26, preferably in a manner fixed against movement, and press the respective frictional element 30 against the intermediate element 16. It is fundamentally possible for the frictional element 30 to be carried along by the spring element 36 and to carry out a movement under the effect of friction relative to the intermediate element 16.

Alternatively, the frictional element 30, in particular comparable to the embodiment of the torsional vibration damper 10 in FIG. 3, can be fixed in a rotationally fixed manner to the intermediate element 16, while the spring element 36 is fixed in a rotationally fixed manner to the output disk 24, 26, so that a relative movement under the effect of friction between the frictional element 30 and the spring element 36 can take place. A contact area of the spring element 36, which is designed in particular as a plate spring, may be formed on the frictional element 30 as a dome so as to avoid sliding contact on a sharp-edged rim of the spring element 36 and to avoid incorporation of the spring element 36 into the material of the frictional element 30.

REFERENCE NUMERALS

10 Torsional vibration damper
12 Input part
14 First cam mechanism
16 Intermediate elements
18 Energy storage element
20 Second cam mechanism
22 Output part
24 First output disk
26 Second output disk
28 Hub
30 Frictional element
32 First suspension lug
34 Second suspension lug
36 Spring element
38 Slide ring
40 Axial stop
42 Further damping stage

The invention claimed is:

1. A torsional vibration damper comprising:
   an input part for introducing a torque,
   a first cam mechanism;
   an intermediate element coupled to the input part via the first cam mechanism such that a relative rotation between the input part and the intermediate element is converted into a linear movement of the intermediate element radially inward or radially outward;
   a compression spring engaged with the intermediate element;
   a second cam mechanism, separate from the first cam mechanism;
   an output part for discharging a vibration-damped torque, coupled to the intermediate element via the second cam mechanism such that a linear movement of the intermediate element is converted into a relative rotation between the output part and the intermediate element; and
   a first frictional element for friction damping, pressed against the intermediate element or the output part.

2. The torsional vibration damper of claim 1 wherein the first frictional element is movement-coupled to the intermediate element or the output part.

3. The torsional vibration damper of claim 1, wherein:
   the output part covers the intermediate element when viewed in an axial direction; and
   the first frictional element is arranged axially between the intermediate element and the output part.

4. The torsional vibration damper of claim 1 further comprising a second frictional element, wherein:
   the output part comprises a first output disk and a second output disk coupled to the first output disk in a rotationally fixed manner;
   the intermediate element is arranged axially between the first output disk and the second output disk;
   the first frictional element is arranged between the intermediate element and the first output disk; and
   the second frictional element is arranged between the intermediate element and the second output disk.

5. The torsional vibration damper of claim 1, wherein:
   the first frictional element is suspended on the intermediate element or on the output part;
   the first frictional element comprises an inner suspension lug and an outer suspension lug; and
   the first frictional element is secured in a radial or tangential direction by the inner suspension lug and the outer suspension lug.

6. The torsional vibration damper of claim 1 further comprising a spring element, wherein:
   the output part comprises a first output disk and a second output disk coupled to the first output disk in a rotationally fixed manner;
   the first output disk and the second output disk are axially displaceable relative to the intermediate element; and
   the spring element is arranged to act on a rear side of the output part facing away from the first frictional element to press the first frictional element between the intermediate element and the output part.

7. The torsional vibration damper of claim 6, wherein the spring element is a pretensioned plate spring or a pretensioned elastomer body.

8. The torsional vibration damper of claim 1 further comprising a spring element arranged between the output part and the intermediate element to press the first frictional element against the intermediate element or the output part.

9. The torsional vibration damper of claim 8, wherein the spring element is a pretensioned plate spring or a pretensioned elastomer body.

10. The torsional vibration damper of claim 1, wherein the first frictional element is a separate component from the intermediate element and the output part.

11. The torsional vibration damper of claim 1, wherein:
    the first friction element comprises a friction surface; and
    the first friction element includes carbon fibers comprising polyamide, Teflon or graphite on the friction surface.

* * * * *